United States Patent
Kjær (10) Patent No.: US 11,146,166 B2
(45) Date of Patent: Oct. 12, 2021

(54) MODULAR MULTI-LEVEL CONVERTER WITH FULL-BRIDGE CELL FAULT CURRENT BLOCKING FOR WIND-TURBINES

(71) Applicant: VESTAS WIND SYSTEMS A/S, Aarhus N (DK)

(72) Inventor: Philip Carne Kjær, Århus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 76 days.

(21) Appl. No.: 16/461,608

(22) PCT Filed: Oct. 30, 2017

(86) PCT No.: PCT/DK2017/050353
§ 371 (c)(1),
(2) Date: May 16, 2019

(87) PCT Pub. No.: WO2018/091051
PCT Pub. Date: May 24, 2018

(65) Prior Publication Data
US 2020/0067401 A1 Feb. 27, 2020

(30) Foreign Application Priority Data
Nov. 17, 2016 (DK) .............................. PA201670912

(51) Int. Cl.
*H02M 1/32* (2007.01)
*H02H 7/12* (2006.01)
(Continued)

(52) U.S. Cl.
CPC ............ *H02M 1/32* (2013.01); *H02H 7/1216* (2013.01); *H02J 3/386* (2013.01); *H02M 5/4585* (2013.01); *H02M 1/325* (2021.05)

(58) Field of Classification Search
CPC ............ H02M 1/32; H02M 2001/325; H02M 5/4585; H02H 7/1216; H02J 3/386
See application file for complete search history.

(56) References Cited

U.S. PATENT DOCUMENTS

2013/0182467 A1  7/2013  Cross et al.

FOREIGN PATENT DOCUMENTS

CN  102281014 A    12/2011
CN  103701145 A *   4/2014
(Continued)

OTHER PUBLICATIONS

Chinese Office Action for application No. 201780071398.X dated Jun. 29, 2020.
(Continued)

*Primary Examiner* — Kyle J Moody
*Assistant Examiner* — Jye-June Lee
(74) *Attorney, Agent, or Firm* — Patterson + Sheridan, LLP (57) ABSTRACT

Embodiments herein describe a power converter in a wind turbine that includes a rectifier and an inverter. The rectifier includes a plurality of phase legs where each phase leg includes a plurality of full bridge cells configured to block fault current from flowing from a generator through the rectifier. Moreover, the wind turbine does not have any circuit breaker between the rectifier and the generator. The inverter also includes a plurality of phase legs where each phase leg includes a plurality of full bridge cells configured to block fault current from flowing from a transformer through the inverter. Moreover, the wind turbine does not have any circuit breaker between the inverter and the transformer.

15 Claims, 6 Drawing Sheets

(51) Int. Cl.
*H02J 3/38* (2006.01)
*H02M 5/458* (2006.01)

(56) References Cited

FOREIGN PATENT DOCUMENTS

| | | | | |
|---|---|---|---|---|
| CN | 103701145 | A | 4/2014 | |
| CN | 104218573 | A * | 12/2014 | |
| CN | 104218573 | A | 12/2014 | |
| CN | 104769804 | A * | 7/2015 | ............ H02K 47/02 |
| CN | 104769804 | A | 7/2015 | |
| EP | 2983280 | A1 | 2/2016 | |
| EP | 3107198 | A1 | 12/2016 | |
| WO | 2012041380 | A1 | 4/2012 | |
| WO | 201411164 | A1 | 1/2014 | |
| WO | 2014111164 | A1 | 7/2014 | |
| WO | WO-2017080597 | A1 * | 5/2017 | ............ H02M 7/483 |
| WO | 2018091051 | A1 | 5/2018 | |

OTHER PUBLICATIONS

Danish Patent and Trademark Office First Technical Examination for Application No. PA 2016 70912 dated Apr. 6, 2017.
PCT International Search Report for Application No. PCT/DK2017/050353 dated Jan. 26, 2018.
Xibo Yuan: 11 Low voltage ride through control of a cascaded high power converter for direct-drive permanent magnet wind generators, I Econ 2012—38th Annual Conference on IEEE Industrial Electronics Society, IEEE, Oct. 25, 2012 (Oct. 25, 2012), pp. 3553-3559.
"High-voltage direct current (HVDC) power transmission using voltage sourced converters (VSC)",Mar. 30, 2011 (Mar. 30, 2011), pp. 1-78.
PCT Written Opinion of the International Searching Authority for Application No. PCT/DK2017/050353 dated Jan. 26, 2018.
PRC National Intellectual Property Administration for Application: 201780071398.X dated Dec. 28, 2020.

* cited by examiner

MODULAR MULTI-LEVEL CONVERTER WITH FULL-BRIDGE CELL FAULT CURRENT BLOCKING FOR WIND-TURBINES

BACKGROUND

Field of the Invention

Embodiments of the disclosure generally relate to wind turbine converter, and more specifically, to wind turbine converter that can block fault current.

Description of the Related Art

Fault current may occur in wind turbines due to failures such as short circuits. High fault current, e.g., surge current, may damage the converter of the wind turbines. In order to protect the converter of a wind turbine from damaged by high fault current, a circuit breaker is usually used between the converter and the generator of the wind turbine, which is known as a machine-side circuit breaker. Also, another circuit breaker is usually used between the converter and the transformer of the wind turbine, which is known as a line-side circuit breaker. With the two circuit breakers, high fault current from either the generator or the transformer will be prevented from flowing to the converter. However, both the machine-side circuit breaker and the line-side circuit breaker for wind turbines are expensive. Thus, using the machine-side circuit breaker and the line-side circuit breaker increases the costs of manufacturing the wind turbines.

SUMMARY

One embodiment of the present disclosure provides a wind turbine. The wind turbine comprises a generator, a transformer, and a power converter coupled between the generator and the transformer. The power converter comprises a rectifier coupled to the generator. The rectifier comprises a first plurality of phase legs. Each of the first plurality of phase legs comprises a full bridge cell configured to block fault current from flowing from the generator through the rectifier. There is no circuit breaker between the rectifier and the generator. The power converter also comprises an inverter. An input of the inverter is coupled to the rectifier via a DC link and an output of the inverter is coupled to the transformer. The inverter comprises a second plurality of phase legs. Each of the second plurality of phase legs comprises a full bridge cell configured to block fault current from flowing from the transformer through the inverter. There is no circuit breaker between the output of the inverter and the transformer.

Another embodiment of the present disclosure provides a wind turbine. The wind turbine comprises a generator and a power converter coupled between the generator and a transformer. The power converter comprises a rectifier coupled to the generator. The rectifier comprises a first plurality of phase legs. Each of the first plurality of phase legs comprises a full bridge cell configured to block fault current from flowing from the generator through the rectifier. There is no circuit breaker between the rectifier and the generator. The power converter also comprises an inverter. An input of the inverter is coupled to the rectifier via a DC link and an output of the inverter is coupled to the transformer. The inverter comprises a second plurality of phase legs. Each of the second plurality of phase legs comprises a full bridge cell configured to block fault current from flowing from the transformer through the inverter. There is no circuit breaker between the output of the inverter and the transformer.

Another embodiment of the present disclosure provides a method implemented in a wind turbine. The wind turbine comprises a power converter coupled between a generator and a transformer. The method comprises detecting a fault current flowing from the generator to a rectifier in the power converter. The rectifier is coupled to the generator, and the rectifier comprises a first plurality of phase legs. The method also comprises detecting a fault current flowing from the transformer to an inverter in the power converter. An input of the inverter is coupled to the rectifier via a DC link and an output of the inverter is coupled to the transformer. The inverter comprises a second plurality of phase legs. The method also comprises blocking the fault current from flowing from the generator through the rectifier by using a full bridge cell in each of the first plurality of phase legs and there is no circuit breaker between the rectifier and the generator. The method further comprises blocking the fault current from flowing from the transformer through the inverter by using a full bridge cell in each of the second plurality of phase legs and there is no circuit breaker between the output of the inverter and the transformer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Many wind turbines use a machine-side circuit breaker between the converter and the generator of the wind turbine. The function is to interrupt the fault current flowing from the generator into the converter. The wind turbines may also use a line-side circuit breaker between the converter and the transformer of the wind turbine to interrupt the fault current flowing from the grid into the converter.

If the machine-side circuit breaker is not used, when there is a high fault current flowing from the generator into the converter, the converter and other circuit components between the converter and the generator can be damaged or destroyed. Similarly, if the line-side circuit breaker is not used, when there is a high fault current flowing from the grid into the converter, the converter and other circuit components between the converter and the grid can be damaged.

However, if the converter itself can interrupt the fault current flowing from the generator and the grid into the converter, the risk of not using the machine-side circuit breaker and the line-side circuit breaker is significantly reduced. Thus, one advantage of the present disclosure is to reduce the risk of not using the machine-side circuit breaker and the line-side circuit breaker in the wind turbine to block high fault current.

Also, both the machine-side circuit breaker and the line-side circuit breaker for wind turbines are expensive. Another advantage of the present disclosure is to reduce the costs of manufacturing wind turbines by eliminating the need of these two circuit breakers.

In the present disclosure, a power converter of the wind turbine utilizes full bridge cells. The full bridge cells can block the fault current from flowing from either the generator or the grid transformer through the power converter. When a fault current is detected, the full bridge cells deactivate switches which prevent the fault current from damaging the power converter. Thus, the machine-side circuit breaker and the line-side circuit breaker are not needed to protect the power converter from damaged by the fault current. Therefore, in one embodiment, there is no machine-side circuit breaker and line-side circuit breaker in the wind turbine.

Figure 1:
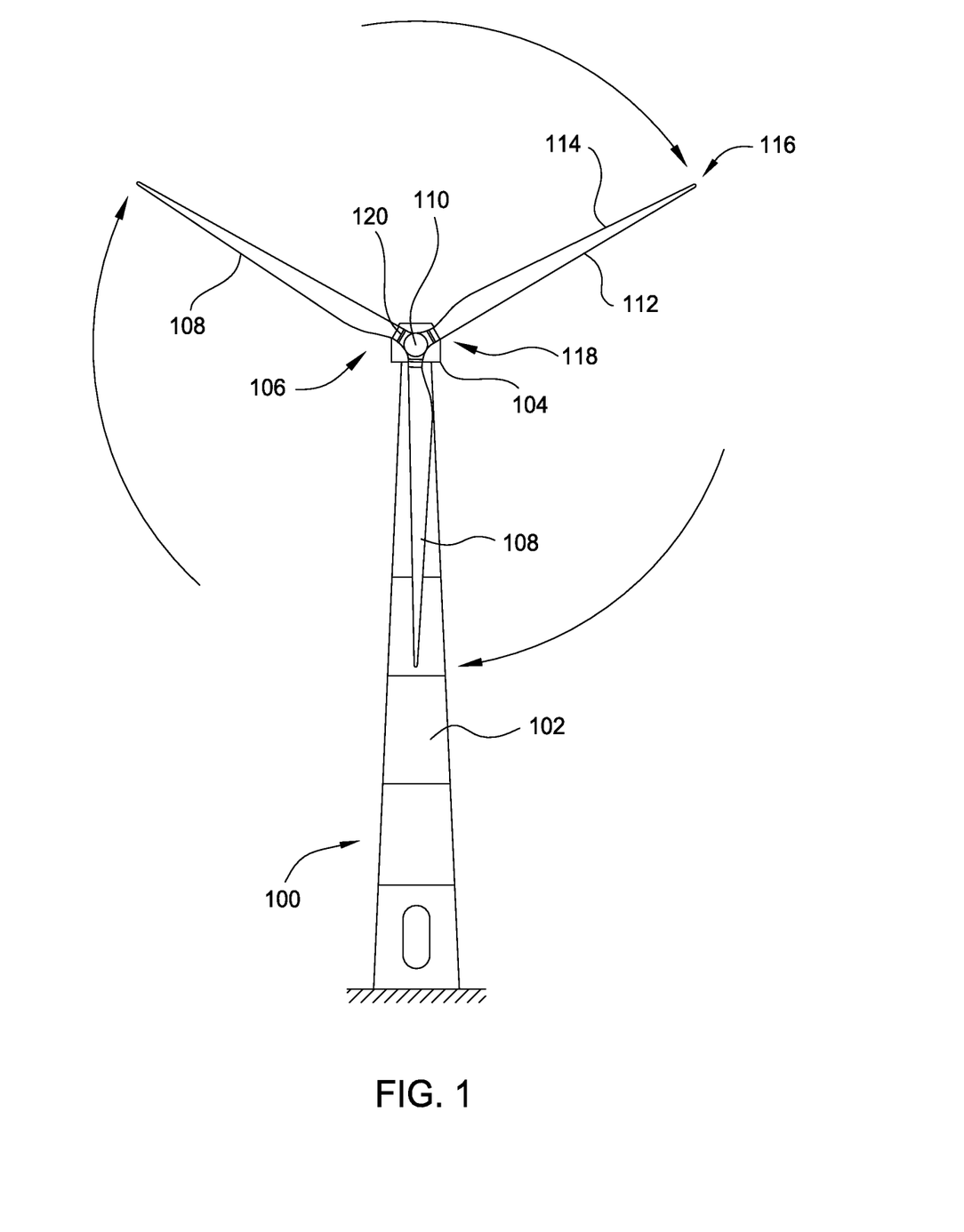
FIG. 1 illustrates a wind turbine, according to one embodiment herein.

FIG. 1 illustrates a horizontal-axis wind turbine 100, according to one embodiment herein. The wind turbine 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108. Although not shown in FIG. 1, a power converter is inside the wind turbine 100. In one embodiment, the power converter is inside the nacelle 104 of the wind turbine 100. The structure of the power converter can eliminate the need of circuit breakers that are used to protect the power converter from fault current, which will be described in more detail below.

Figure 2:
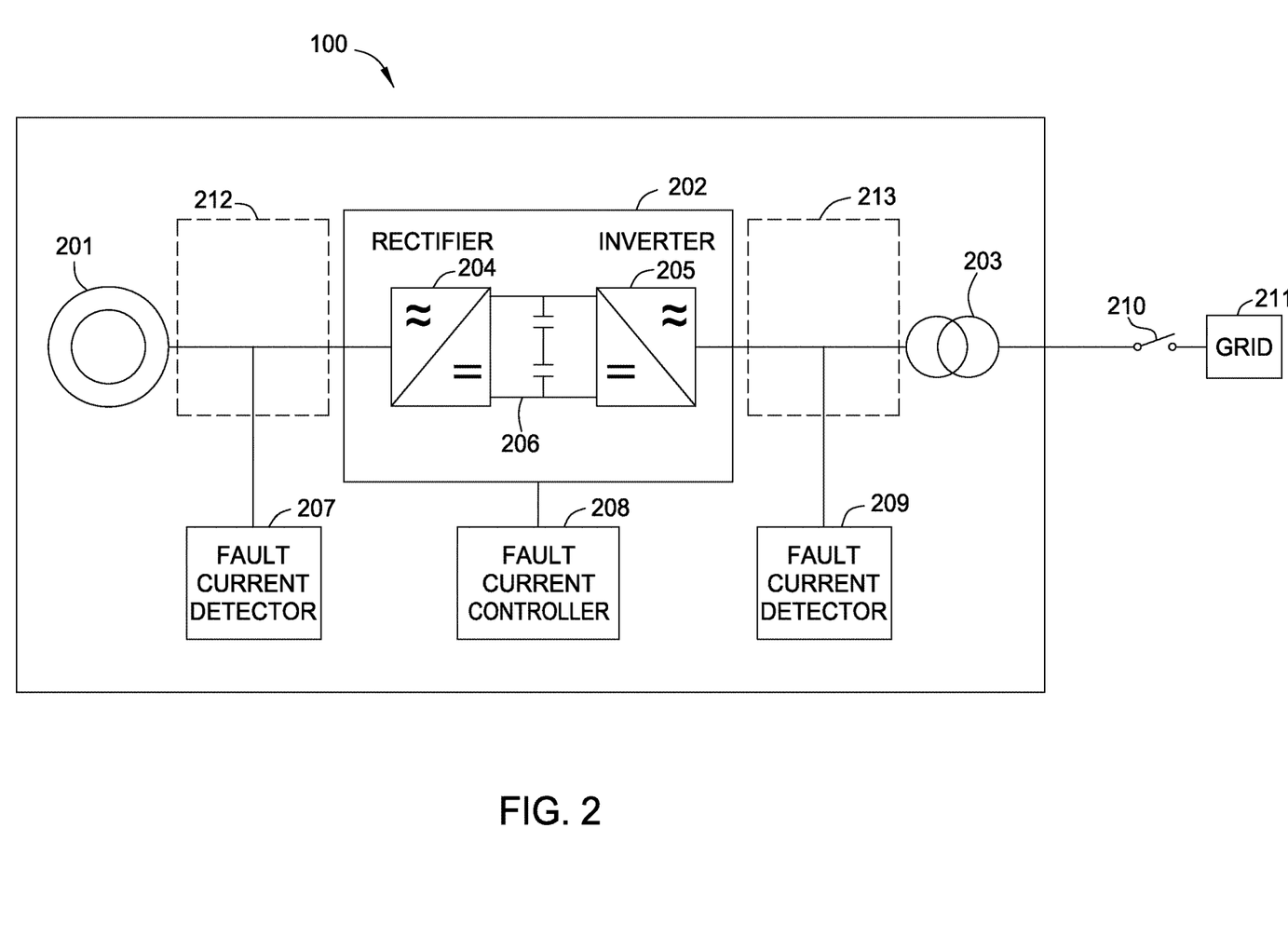
FIG. 2 illustrates components of a wind turbine, according to one embodiment herein.

FIG. 2 illustrates components of the wind turbine 100, according to one embodiment herein. As shown in FIG. 2, the wind turbine 100 includes a generator 201 to generate electrical power. In one embodiment, the generator 201 is a permanent magnet (PM) generator that can generate alternating current (AC). In another embodiment, the generator 201 is a synchronous generator. When a PM synchronous generator is used, the generator's magnetization is permanent. The PM synchronous generator may generate a fault current. In another embodiment, the generator 201 is an asynchronous generator.

The wind turbine 100 also includes a power converter 202 that includes a rectifier 204 coupled to the generator 201. The rectifier 204 converts the AC current provided by the generator to a direct current (DC). The power converter 202 also includes an inverter 205 that coverts the DC current from the rectifier 204 to an output AC current. As shown in FIG. 2, the input of the inverter 205 is coupled to the rectifier 204 via a DC link 206 and the output of the inverter 205 is coupled to a grid transformer 203. In one embodiment, the grid transformer 203 increases the voltage and decreases the current of the power output by the inverter 205. The transformed power output by the grid transformer 203 is transferred to the grid 211. In one embodiment, the grid transformer 203 is inside the wind turbine 100. In another embodiment, the grid transformer 203 is a transformer outside the wind turbine 100.

A circuit breaker 210 is coupled between the output of the grid transformer 203 and the grid 211. In case of high fault current flowing between the grid transformer 203 and the grid 211, the circuit breaker 210 breaks the connection between the grid transformer 203 and the grid 211 so that flow of the high fault current between the grid transformer 203 and the grid 211 is interrupted. In this way, the circuit breaker 210 can prevent the high fault current from damaging the grid transformer 203. In this embodiment, the circuit breaker 210 is outside the wind turbine 100.

One embodiment of the present disclosure eliminates the need of circuit breakers between the generator 201 and the rectifier 204 and between the inverter 205 and the grid transformer 203. As shown in FIG. 2, a fault current detector 207 is coupled to a node between the generator 201 and the rectifier 204. When the fault current detector 207 detects a fault current (e.g. a surge in AC current) flowing from the generator 201 to the rectifier 204, the fault current detector 207 sends a signal indicating the detection of the fault current to a fault current controller 208 coupled to the fault current detector 207. The fault current controller 208 controls the rectifier 204 to block the fault current from flowing from the generator 201 through the rectifier 204. Because the rectifier 204 itself can block the fault current from flowing from the generator 201 through the rectifier 204, the rectifier 204 prevents the fault current from damaging the power converter 202. Thus, a circuit breaker is not needed between the generator 201 and the rectifier 204. Block 212 shows a non-circuit breaker zone between the generator 201 and the rectifier 204 where there are no circuit breakers electrically coupled to the transmission line or lines that transmit electrical power between the generator 201 and the power converter 202. In one embodiment, the circuit breaker 210 also protects circuit components in the non-circuit breaker zone as shown in block 212 when there is a fault current flowing from the generator 201 to the rectifier 204.

Similarly, as shown in FIG. 2, a fault current detector 209 is coupled to a node between the inverter 205 and the grid transformer 203. When the fault current detector 209 detects a fault current (e.g. a surge AC current) flowing from the grid transformer 203 to the inverter 205, the fault current detector 209 sends a signal indicating the detection of the fault current to the fault current controller 208 coupled to the fault current detector 209. The fault current controller 208 controls the inverter 205 to block the fault current from flowing from the grid transformer 203 through the inverter 205. Because the inverter 205 itself can block the fault current from flowing from the grid transformer 203 through the inverter 205, the inverter 205 prevents the fault current from damaging the power converter 202. Thus, a circuit breaker is not needed between the inverter 205 and the grid transformer 203. Block 213 shows a non-circuit breaker zone between the inverter 205 and the grid transformer 203 where there are no circuit breakers electrically coupled to the transmission line or lines that transmit electrical power between the generator 201 and the grid transformer 203. In one embodiment, the circuit breaker 210 also protects circuit components in the non-circuit breaker zone as shown in block 213 when there is a fault current flowing from the grid transformer 203 to the inverter 205.

In one embodiment, the wind turbine 100 (which does not have circuit breakers between the generator 201 and the rectifier 204 and between the inverter 205 and the grid transformer 203) operates at voltage over 1 kV (medium-voltage). As used herein, the term "circuit breakers" includes fuses or resettable circuit breakers. Thus, in one embodiment, there are no fuses or resettable circuit breakers between the generator 201 and the power converter 202 and between the converter 202 and the grid transformer 203.

Figure 3A:
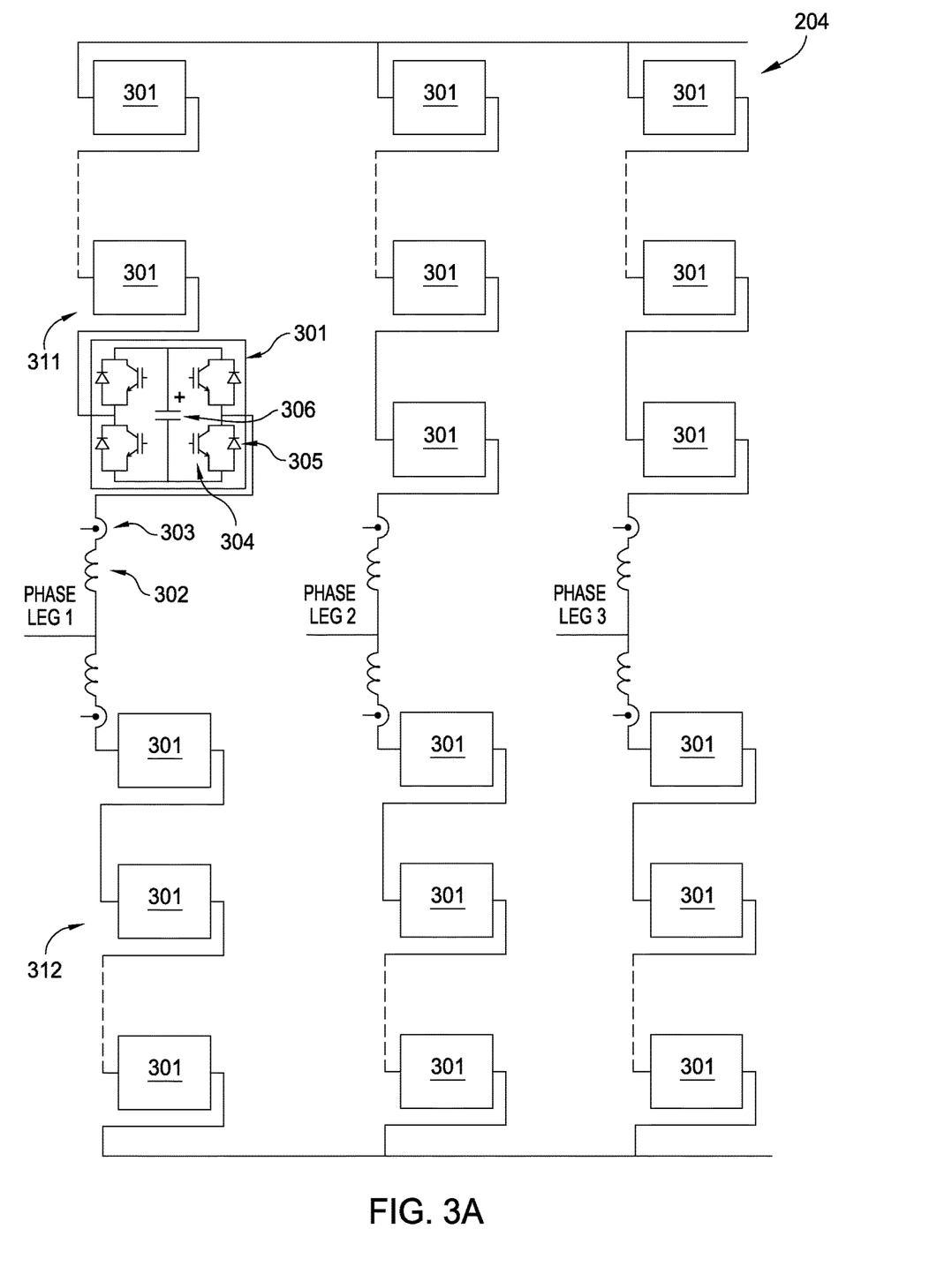
FIG. 3A illustrates a rectifier in a power converter of a wind turbine, according to one embodiment herein.

FIG. 3A illustrates a structure of the rectifier 204, according to one embodiment herein. In FIG. 3A, the rectifier 204 has multiple phase legs, e.g., phase leg 1, phase leg 2 and phase leg 3. Each phase leg has two arms, i.e., an upper arm and a lower arm. As shown, phase leg 1 has an upper arm 311 that includes an inductor 302 and a current sensor 303. The current sensor 303 can sense the current in the upper arm 311 to detect whether a fault current is flowing into the upper arm 311. The current sensor 303 can be located at different places, such as at the top or the bottom of the upper arm 311, above or below the inductor 302. The upper arm 311 also includes a plurality of cells. As shown in FIG. 3A, in the upper arm 311, all the cells are full bridge cells having the same full bridge structure, as denoted by blocks 301. For simplicity of illustration, only one block 301 shows the specific structure of the full bridge cell. Specifically, the full bridge cell 301 includes four insulated-gate bipolar transistors (IGBTs) 304, each of which is coupled in parallel with a diode 305. The full bridge cell 301 also includes a storage capacitor 306.

The lower arm 312 has a similar structure as the upper arm 311. As shown in FIG. 3A, the lower arm 312 also includes a plurality of cells where all the cells in the lower arm 312 are full bridge cells, as denoted by blocks 301. Phase leg 2 and phase leg 3 have substantially the same structure as phase leg 1. That is, all the cells in the upper arm and the lower arm in phase leg 2 and phase leg 3 are full bridge cells, as denoted by blocks 301.

With the structure in FIG. 3A, when the fault current detector 207 detects a fault current flowing from the generator 201 to the rectifier 204, the fault current detector 207 sends a signal indicating the detection of the fault current, to the fault current controller 208. The fault current controller 208 deactivates the four IGBTs 304 in the full bridge cells 301 in each arm of each phase leg. Thus, the fault current does not flow through any of the IGBTs 304 in the full bridge cells 301. Instead, the fault current flows through one or more diodes 305 in the full bridge cells 301 to charge the storage capacitor 306 in the full bridge cells 301. By charging the capacitor 306, the capacitor 306 generates an opposing voltage to block the fault current from flowing through the rectifier 204. Also, charging the capacitor 306 by the fault current is not harmful to the four IGBTs 304 in the full bridge cells 301. Thus, with the structure in FIG. 3A, the full bridge cells 301 in each arm block the fault current from flowing through the arm, so that the fault current does not cause damage to the rectifier 204.

Figure 3B:
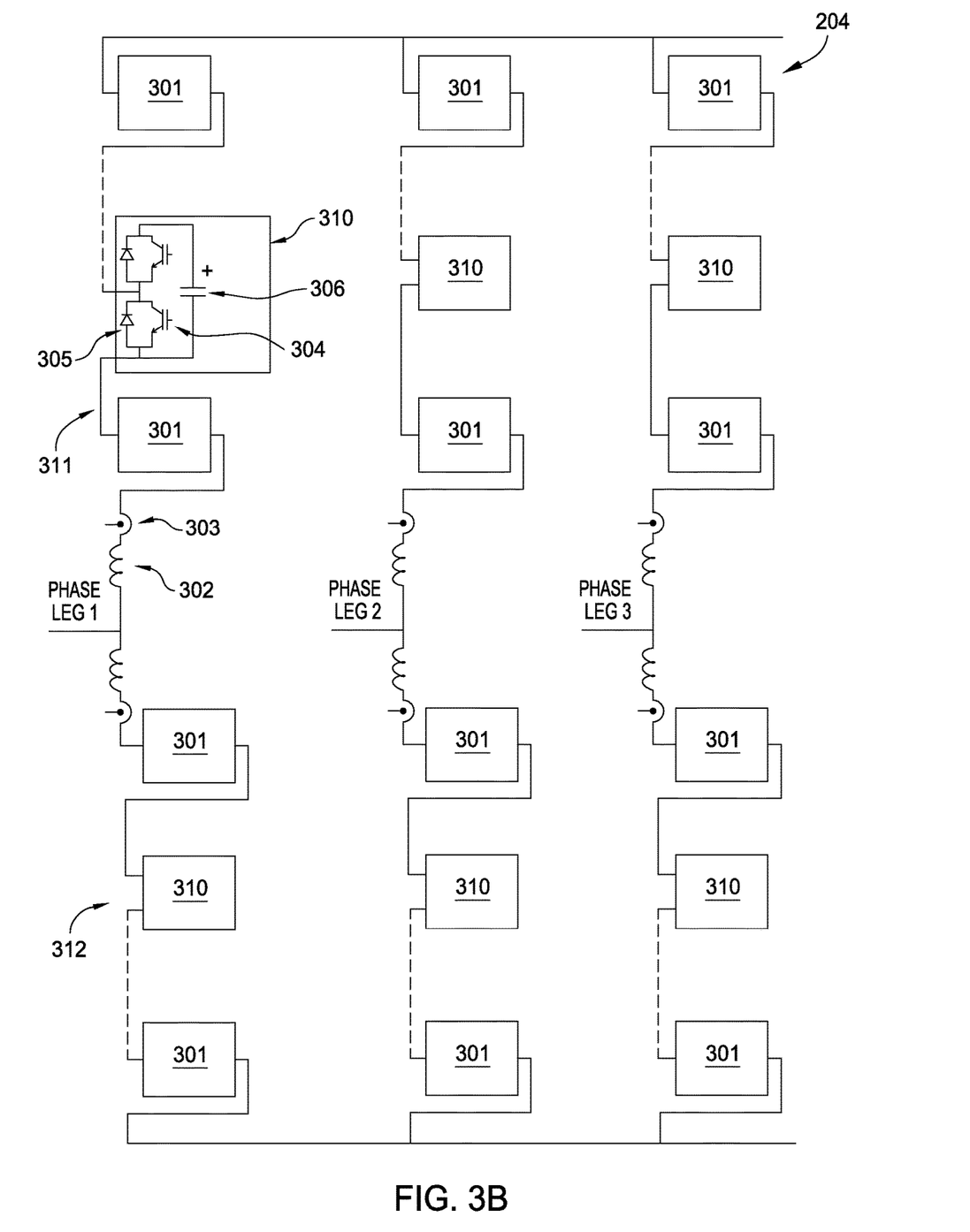
FIG. 3B illustrates a rectifier in a power converter of a wind turbine, according to another embodiment herein.

FIG. 3B illustrates a different structure of the rectifier 204, according to another embodiment herein. Similarly as In FIG. 3A, in FIG. 3B, the rectifier 204 also has multiple phase legs, e.g., phase leg 1, phase leg 2 and phase leg 3. Phase leg 1 has two arms, i.e., an upper arm 311 and a lower arm 312. The upper arm 311 also includes a plurality of cells. However, in FIG. 3B, the upper arm 311 has one cell that is a half bridge cell with a half bridge structure, as denoted by block 310. The remaining cells in the upper arm 311 are full bridge cells 301 as illustrated FIG. 3A. The half bridge cell 310 includes two IGBTs 304, each is coupled with a diode 305 in parallel. The half bridge cell 310 also includes a storage capacitor 306.

In FIG. 3B, the lower arm 312 has a similar structure as the upper arm 311. As shown, the lower arm 312 also includes a plurality of cells where one of the cells is a half bridge cell as denoted by block 310. The remaining cells are full bridge cells 301. Phase leg 2 and phase leg 3 have substantially the same structure as phase leg 1. That is, one of the cells in the upper arm and the lower arm in phase leg 2 and phase leg 3 is a half bridge cell, as denoted by block 310. All other cells in the upper arm and the lower arm in phase leg 2 and phase leg 3 are full bridge cells 301.

With the structure in FIG. 3B, when the fault current detector 207 detects a fault current flowing from the generator 201 to the rectifier 204, the fault current detector 207 sends a signal indicating the detection of the fault current, to the fault current controller 208. The fault current controller 208 deactivates the four IGBTs 304 in the full bridge cells 301 in each arm of each phase leg and deactivates the two IGBTs 304 in the half bridge cell 310 in each arm of each phase leg. In the half bridge cell 310, the fault current does not flow through a diode 305 to charge the capacitor 306 to generate an opposing voltage to block the fault current. Instead, in the half bridge cell 310, the fault current may directly flow through a diode 305 in the half bridge cell 310 to adjacent cells or other components of the rectifier 204.

However, as explained above, the fault current does not flow through any of the IGBTs 304 in the full bridge cells 301. Thus, even with a half bridge cell 310 in each arm of each phase leg which would otherwise permit the fault current to flow through a diode 305, the presence of the full bridge cells 301 in each arm of each phase leg can still block the fault current from flowing through the arm, so that the fault current does not cause damage to the rectifier 204. That is, neither the half-bridge cells 310 nor the full-bridge cells 301 are harmed by the fault current.

FIG. 3A and FIG. 3B only show two embodiments of the rectifier 204. In other embodiments, for each phase legs, each of the arms may comprise a different number of full bridge cells 301 and a different number of half bridge cells 310. For example, each of the arms in each of the phase legs may comprise a same number of full bridge cells 301, e.g., 6 full bridge cells 301 in the arm. In another example, each of the arms in each of the phase legs may comprise the same number of half bridge cells and full bridge cells, e.g., 5 full bridge cells 301 and 5 half bridge cells 310 in each arm. Other combinations of full bridge cells 301 and half bridge cells 310 are also possible, as understood by an ordinary person in the art. In one embodiment, at least half of the cells are full bridge cells 301 in each arm of each phase leg to block the fault current from flowing through the arm.

Figure 4:
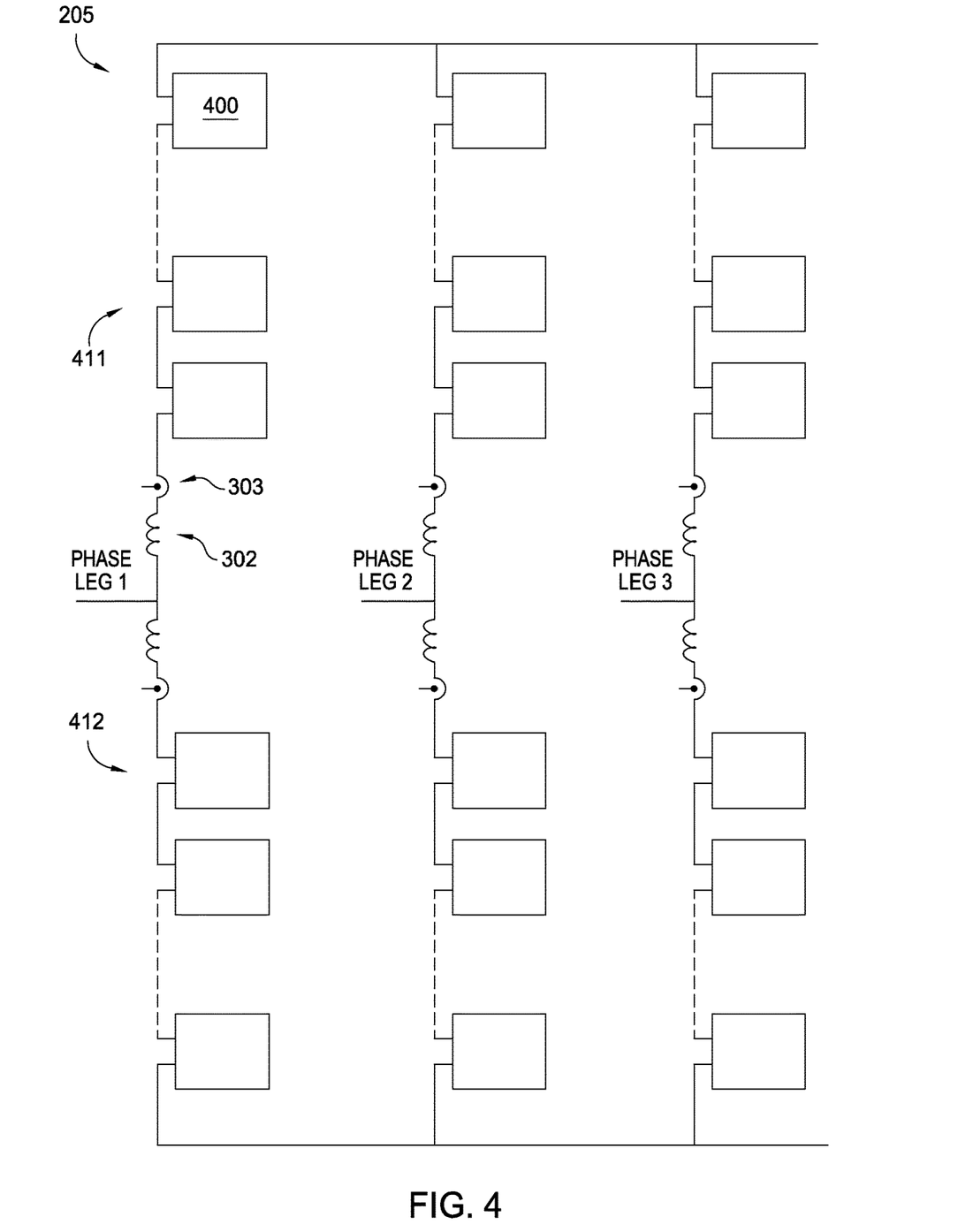
FIG. 4 illustrates an inverter in a power converter of a wind turbine, according to one embodiment herein.

FIG. 4 illustrates a structure of the inverter 205, according to one embodiment herein. As shown in FIG. 4, the inverter 205 has a similar structure as the rectifier 204 shown in FIG. 3A and FIG. 3B. Specifically, the inverter 205 has multiple phase legs, e.g., phase leg 1, phase leg 2 and phase leg 3. Phase leg 1 has two arms, i.e., an upper arm 311 and a lower arm 312. Phase leg 2 and phase leg 3 have substantially the same structure as phase leg 1.

In FIG. 4, each arm of each phase leg comprises a plurality of cells 400. A cell 400 can be a full bridge cell 301 or a half bridge cell 310, as shown in FIG. 3A and FIG. 3B. In each arm, different combinations of full bridge cells 301 and half bridge cells 310 are possible, as explained above. For example, all the cells 400 in each arm can be full bridge cells 301. In another example, one cell 400 in each arm can be a half bridge cell 310 and all other cells 400 in each arm can be full bridge cells 301. In another example, in each arm, a same number of cells 400 are full bridge cells 301. In another example, in each arm, half of the cells 400 are full bridge cells 301 and half of the cells 400 are half bridge cells 310. Like for the rectifier 204, in one embodiment, at least half of the cells 400 in each arm of each phase leg in the inverter 205 are full bridge cells 301 to block the fault current from flowing through the arm.

With the structure in FIG. 4, when the fault current detector 209 detects a fault current (e.g. a surge AC current) flowing from the grid transformer 203 to the inverter 205, the fault current detector 209 sends a signal indicating the detection of the fault current, to the fault current controller 208. The fault current controller 208 deactivates the four IGBTs 304 in the cells 400 with a full bridge structure in each arm of each phase leg. The fault current does not flow through any of the IGBTs 304 in the cells 400 with a full bridge structure. Thus, with the structure in FIG. 4, the cells 400 with a full bridge structure block the fault current from flowing through the inverter 205 so that the fault current does not cause damage to the inverter 205.

Because the rectifier 204 and inverter 205 can block the fault current from flowing from the generator 201 through the rectifier 204 and from the grid transformer 203, the rectifier 204 and inverter 205 prevent the fault current from damaging the power converter 202. Thus, circuit breakers are not needed between the generator 201 and the rectifier 204 and between the inverter 205 and the grid transformer 203. By eliminating the need of the two circuit breakers in the positions described above, costs of manufacturing wind turbines can be reduced. In one embodiment, to provide additional safety to the wind turbines, a disconnector can be used between the generator 201 and the rectifier 204 and another disconnector can be used between the grid transformer 203 and the inverter 205, which can be controlled manually by a technician to disconnect the components during, e.g., maintenance or when installing the wind turbine. However, in one embodiment, these disconnectors are not switched or activated by the amount of current flowing through them. That is, even if there is a high fault current flowing through the disconnectors, the disconnectors do not disconnect the generator 201 from the rectifier 204 and the grid transformer 203 from the inverter 205 while circuit breakers would disconnect these components.

Figure 5:
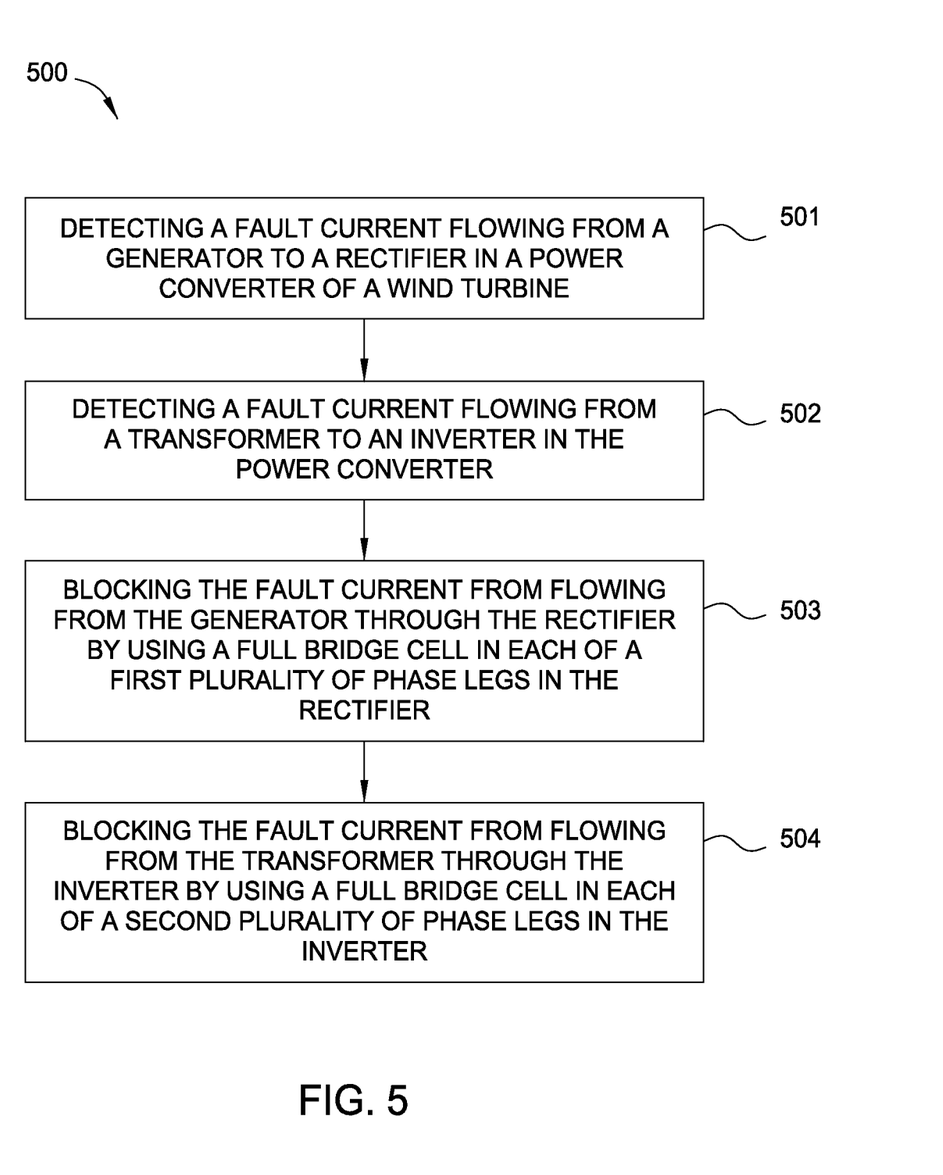
FIG. 5 illustrates a method of blocking fault current for a wind turbine, according to one embodiment herein.

FIG. 5 is a method 500 of blocking fault current for a wind turbine, according to one embodiment herein. The method 500 includes detecting a fault current flowing from a generator to a rectifier in a power converter of a wind turbine, as shown in block 501. For example, the fault current detector 207 detects a fault current flowing from the generator 201 to the rectifier 204 in the power converter 202 of the wind turbine 100. The method 500 also includes detecting a fault current flowing from a transformer to an inverter in the power converter, as shown in block 502. The method 500 further includes at block 503 blocking the fault current from flowing from the generator through the rectifier by using a full bridge cell in each of a first plurality of phase legs in the rectifier. As described above, in one embodiment, there is no circuit breaker between the rectifier and the generator. For example, referring to FIG. 2, the fault current detector 209 detects a fault current flowing from the grid transformer 203 to the inverter 205 in the power converter 202. The rectifier 204 blocks the fault current from flowing from the generator 201 through the rectifier 204 by using a full bridge cell 301 in each of a first plurality of phase legs in the rectifier 204.

Additionally, at block 504, the wind turbine blocks fault current from flowing from the transformer through the inverter by using a full bridge cell in each of a second plurality of phase legs in the inverter. In FIG. 2, the inverter 205 blocks the fault current from flowing from the grid transformer 203 through the inverter 205 by using a full bridge cell 301 in each of a second plurality of phase legs in the inverter 205, and there is no circuit breaker between the output of the inverter 205 and the grid transformer 203.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A wind turbine, comprising:
a generator;
a transformer;
a power converter coupled between the generator and the transformer, wherein the power converter comprises:
a rectifier coupled to the generator, wherein the rectifier comprises a first plurality of phase legs, wherein each of the first plurality of phase legs comprises a first full bridge cell, wherein, in response to a first current detector positioned between the generator and the rectifier detecting a first fault current flowing from the generator towards the rectifier, all transistors of the first full bridge cell are deactivated to block the first fault current from flowing from the generator through the rectifier, and wherein there is no circuit breaker between the rectifier and the generator; and
an inverter, wherein an input of the inverter is coupled to the rectifier via a direct current (DC) link and an output of the inverter is coupled to the transformer, wherein the inverter comprises a second plurality of phase legs, wherein each of the second plurality of phase legs comprises a second full bridge cell, wherein, in response to a second current detector positioned between the inverter and the transformer detecting a second fault current flowing from the transformer towards the inverter, all transistors of the second full bridge cell are deactivated to block the second fault current from flowing from the transformer through the inverter, and wherein there is no circuit breaker between the output of the inverter and the transformer.

2. The wind turbine of claim 1, further comprising:
a controller configured to:
deactivate the transistors in the first full bridge cell in each of the first plurality of phase legs, upon detecting the first fault current by the first current detector; and
deactivate the transistors in the second full bridge cell in each of the second plurality of phase legs, upon detecting the second fault current by the second current detector.

3. The wind turbine of claim 1, wherein each of the first plurality of phase legs comprises a first upper arm and a first lower arm, wherein each of the first upper arm and the first lower arm comprises a first plurality of cells, and wherein each of the second plurality of phase legs comprises a second upper arm and a second lower arm, wherein each of the second upper arm and the second lower arm comprises a second plurality of cells.

4. The wind turbine of claim 3, for each of the first plurality of phase legs, each of the first upper arm and the first lower arm comprises a same number of full bridge cells, and for each of the second plurality of phase legs, each of the second upper arm and the second lower arm comprises a same number of full bridge cells.

5. The wind turbine of claim 3, wherein all the first plurality of cells and all the second plurality of cells are full bridge cells.

6. The wind turbine of claim 3, wherein, for each of the first plurality of phase legs, each of the first upper arm and the first lower arm comprises at least one half bridge cell, and for each of the second plurality of phase legs, each of the second upper arm and the second lower arm comprises at least one half bridge cell.

7. The wind turbine of claim 6, wherein, for each of the first plurality of phase legs, each of the first upper arm and the first lower arm comprises a same number of half bridge cells and full bridge cells, and for each of the second plurality of phase legs, each of the second upper arm and the second lower arm comprises a same number of half bridge cells and full bridge cells.

8. A wind turbine, comprising:
a generator;
a power converter coupled between the generator and a transformer, wherein the power converter comprises:
a rectifier coupled to the generator, wherein the rectifier comprises a first plurality of phase legs, wherein each of the first plurality of phase legs comprises a first full bridge cell, wherein, in response to a first current detector positioned between the generator and the rectifier detecting a first fault current flowing from the generator towards the rectifier, all transistors of the first full bridge cell are deactivated to block the first fault current from flowing from the generator through the rectifier, and wherein there is no circuit breaker between the rectifier and the generator; and
an inverter, wherein an input of the inverter is coupled to the rectifier via a direct current (DC) link and an output of the inverter is coupled to the transformer, wherein the inverter comprises a second plurality of phase legs, wherein each of the second plurality of phase legs comprises a second full bridge cell, wherein, in response to a second current detector positioned between the inverter and the transformer detecting a second fault current flowing from the transformer towards the inverter, all transistors of the second full bridge cell are deactivated to block the second fault current from flowing from the transformer through the inverter, and wherein there is no circuit breaker between the output of the inverter and the transformer.

9. The wind turbine of claim 8, further comprising:
a controller configured to:

deactivate transistors in the first full bridge cell in each of the first plurality of phase legs, upon detecting the first fault current by the first current detector; and deactivate transistors in the second full bridge cell in each of the second plurality of phase legs, upon detecting the second fault current by the second current detector.

10. The wind turbine of claim 8, wherein each of the first plurality of phase legs comprises a first upper arm and a first lower arm, wherein each of the first upper arm and the first lower arm comprises a first plurality of cells, and wherein each of the second plurality of phase legs comprises a second upper arm and a second lower arm, wherein each of the second upper arm and the second lower arm comprises a second plurality of cells.

11. The wind turbine of claim 10, for each of the first plurality of phase legs, each of the first upper arm and the first lower arm comprises a same number of full bridge cells, and for each of the second plurality of phase legs, each of the second upper arm and the second lower arm comprises a same number of full bridge cells.

12. The wind turbine of claim 10, wherein all the first plurality of cells and all the second plurality of cells are full bridge cells.

13. The wind turbine of claim 10, wherein, for each of the first plurality of phase legs, each of the first upper arm and the first lower arm comprises at least one half bridge cell, and for each of the second plurality of phase legs, each of the second upper arm and the second lower arm comprises at least one half bridge cell.

14. The wind turbine of claim 13, wherein, for each of the first plurality of phase legs, each of the first upper arm and the first lower arm comprises a same number of half bridge cells and full bridge cells, and for each of the second plurality of phase legs, each of the second upper arm and the second lower arm comprises a same number of half bridge cells and full bridge cells.

15. A method implemented in a wind turbine, wherein the wind turbine comprises a power converter coupled between a generator and a transformer, the method comprising:

detecting, by a first current detector positioned between the generator and the power converter, a first fault current flowing from the generator towards a rectifier in the power converter, wherein the rectifier is coupled to the generator, wherein the rectifier comprises a first plurality of phase legs, and wherein the first plurality of phase legs comprises a first full bridge cell;

detecting, by a second current detector positioned between the power converter and the transformer, a second fault current flowing from the transformer towards to an inverter in the power converter, wherein an input of the inverter is coupled to the rectifier via a direct current (DC) link and an output of the inverter is coupled to the transformer, wherein the inverter comprises a second plurality of phase legs, and wherein the second plurality of phase legs comprises a second full bridge cell;

in response to the first current detector detecting the first fault current, deactivating all transistors of the first full bridge cell to block the first fault current from flowing from the generator through the rectifier, wherein there is no circuit breaker between the rectifier and the generator; and in response to the second current detector detecting the second fault current, deactivating all transistors of the second full bridge cell to block the second fault current from flowing from the transformer through the inverter, wherein there is no circuit breaker between the output of the inverter and the transformer.

* * * * *